(12) United States Patent
Hofrichter et al.

(10) Patent No.: US 11,756,712 B2
(45) Date of Patent: Sep. 12, 2023

(54) SENSOR DEVICE AND METHOD FOR MANUFACTURING A SENSOR DEVICE

(71) Applicant: TDK Electronics AG, Munich (DE)

(72) Inventors: Alfred Hofrichter, Hartberg (AT); Thomas Feichtinger, Graz (AT)

(73) Assignee: TDK Electronics AG, Munich (DE)

( * ) Notice: Subject to any disclaimer, the term of this patent is extended or adjusted under 35 U.S.C. 154(b) by 49 days.

(21) Appl. No.: 17/597,059

(22) PCT Filed: Aug. 14, 2020

(86) PCT No.: PCT/EP2020/072850
§ 371 (c)(1),
(2) Date: Dec. 23, 2021

(87) PCT Pub. No.: WO2021/052690
PCT Pub. Date: Mar. 25, 2021

(65) Prior Publication Data
US 2022/0246335 A1 Aug. 4, 2022

(30) Foreign Application Priority Data
Sep. 20, 2019 (DE) .......................... 102019125340.3

(51) Int. Cl.
*H01C 7/18* (2006.01)
*G01K 7/22* (2006.01)
(Continued)

(52) U.S. Cl.
CPC ................ *H01C 7/18* (2013.01); *G01K 7/22* (2013.01); *H01C 7/04* (2013.01); *H01C 17/006* (2013.01)

(58) Field of Classification Search
CPC .......... H01C 7/18; H01C 7/04; H01C 17/006; G01K 7/22
See application file for complete search history.

(56) References Cited

U.S. PATENT DOCUMENTS 6,008,717 A 12/1999 Kawase et al.
6,614,112 B2 9/2003 Uchida
(Continued)

FOREIGN PATENT DOCUMENTS

DE 19806296 A1 9/1998
DE 102004005664 B4 9/2005
(Continued)

*Primary Examiner* — Kyung S Lee
(74) *Attorney, Agent, or Firm* — Slater Matsil, LLP

(57) ABSTRACT

In an embodiment a sensor device includes a sensor chip having a plurality of printed ceramic layers and unprinted ceramic layers, at least one termination layer configured to make electrical contact with an electrically conductive material, wherein the termination layer is formed at least on a top side and/or on a bottom side of the sensor chip, wherein the printed ceramic layers are at least partially printed with an electrically conductive material, and wherein an electrical resistance of the sensor chip is determined by an overlap area of the electrically conductive material or by a distance of the electrically conductive material from the termination layer and at least one damping layer directly located at at least a partial area of an outer surface of the sensor chip, wherein the damping layer includes a material which has a greater elasticity than a material of the termination layer.

18 Claims, 2 Drawing Sheets

(51) Int. Cl.
    *H01C 7/04*     (2006.01)
    *H01C 17/00*    (2006.01)

(56) References Cited

U.S. PATENT DOCUMENTS

| | | |
|---|---|---|
| 7,548,149 B2 | 6/2009 | Miura et al. |
| 7,812,705 B1* | 10/2010 | Kozhukh ............... H01C 7/042 |
| | | 338/220 |
| 9,840,787 B2 | 12/2017 | Kitada et al. |
| 9,967,980 B2 | 5/2018 | Masunari et al. |
| 2004/0119579 A1 | 6/2004 | Takehana et al. |
| 2009/0096569 A1* | 4/2009 | Choi .................... H01C 17/065 |
| | | 156/89.12 |
| 2009/0108984 A1* | 4/2009 | Choi ................ H01C 17/06533 |
| | | 29/612 |
| 2014/0106141 A1 | 4/2014 | Bellman et al. |

FOREIGN PATENT DOCUMENTS

| | | |
|---|---|---|
| DE | 19806296 B4 | 3/2006 |
| DE | 102012110556 A1 | 5/2014 |
| JP | H10116708 A | 5/1998 |
| JP | 2000243662 A | 9/2000 |
| JP | 2003092306 A | 3/2003 |
| JP | 2003318059 A | 11/2003 |
| JP | 2017126715 A | 7/2017 |
| JP | 2018142622 A | 9/2018 |
| JP | 2019087581 A | 6/2019 |

\* cited by examiner

FIG 1 - Prior Art -
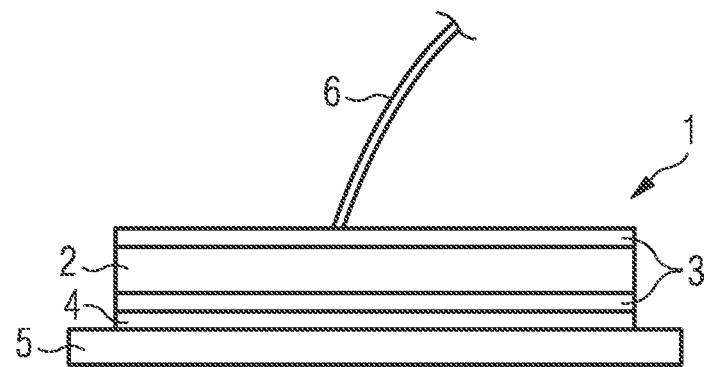
FIG 2
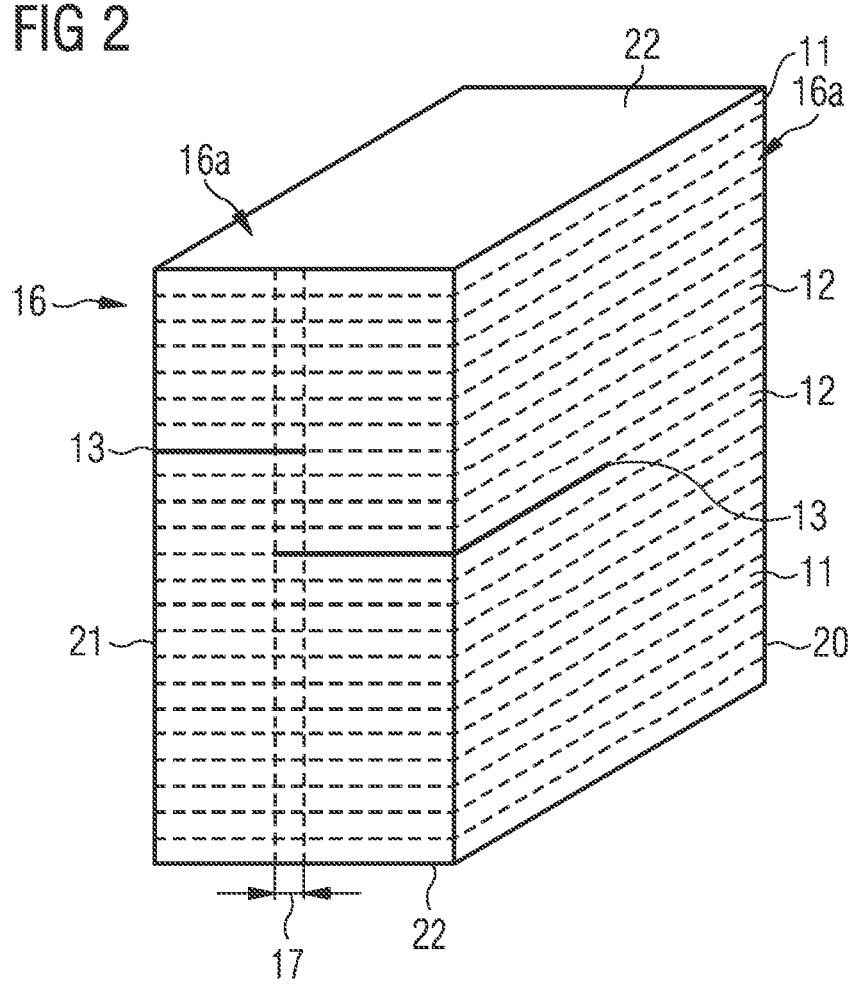

FIG 3
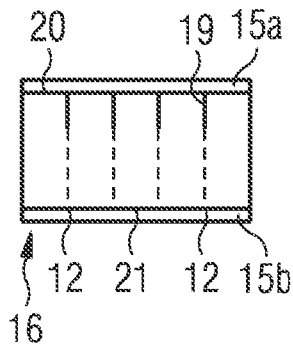
a)
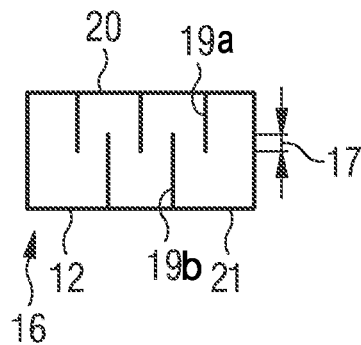
b)
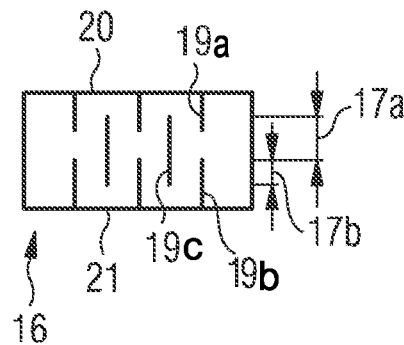
c)
FIG 4
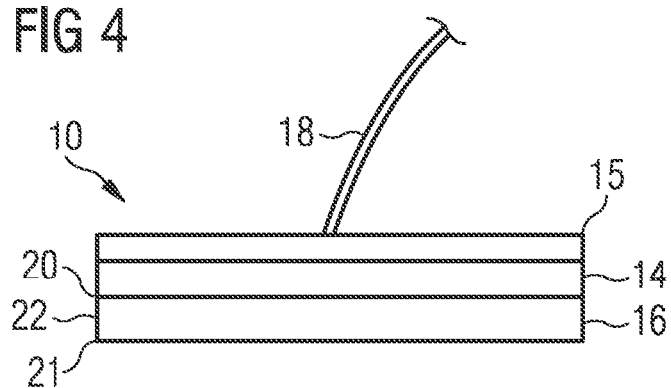
FIG 5
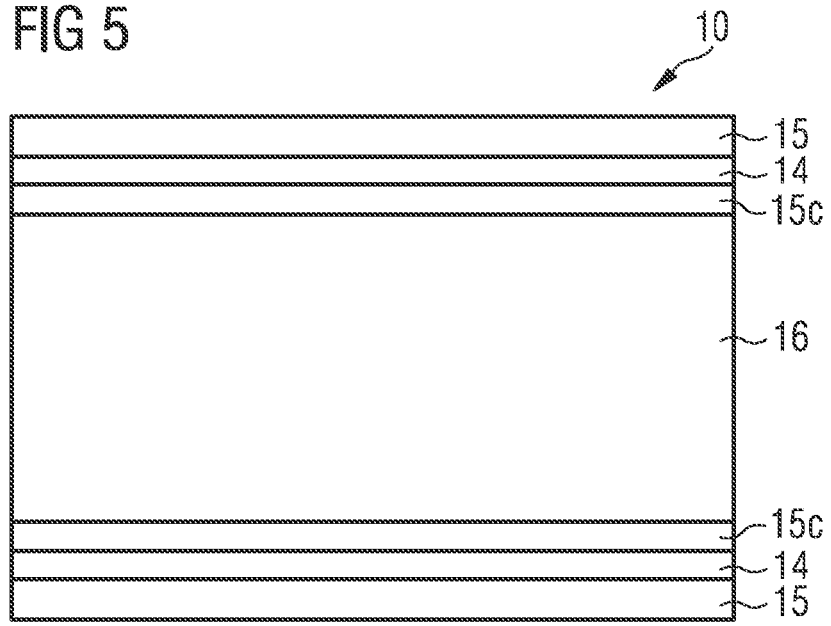

SENSOR DEVICE AND METHOD FOR MANUFACTURING A SENSOR DEVICE

This patent application is a national phase filing under section 371 of PCT/EP2020/072850, filed Aug. 14, 2020, which claims the priority of German patent application 102019125340.3, filed Sep. 20, 2019, each of which is incorporated herein by reference in its entirety.

TECHNICAL FIELD

The present invention relates to a sensor device, in particular a sensor device for measuring a temperature. The present invention further relates to a method for manufacturing a sensor device.

BACKGROUND

In various applications, in particular for high power modules such as PIMs (Power Integrated Modules), chips, in particular ceramic chips, are used. These chips are used, among other things, for temperature measurement.

Typically, a corresponding system consists of a ceramic chip that is applied with termination layers onto a substrate by means of a sintering process. This ceramic chip is then contacted on the surface by means of a bonding wire, whereby the termination layer must be adapted to the bonding material and bonding technology.

The ceramic chips are usually cut out of a sintered and polished substrate, whereby the resistance of the component is controlled by the geometry. This process is relatively complex, especially for tight resistance tolerances, because the geometry has a very large influence. As a result, this process is subject to rejects, relatively complicated and expensive. Furthermore, the geometry of the components is not uniform, as the chips from each ceramic substrate can have slightly different geometries. The sawing process can also cause damage to the component.

Depending on the bonding technology and the process parameters selected for the entire module (bonding wire material, bonding wire thickness), very high forces can also act on the ceramic chip. This can result in damage such as chipping, which can lead to complete breakage of the chip.

To reduce the mechanical damage, it has so far only been possible either to adjust the bonding parameters (e.g. thinner bonding wire), to make the ceramic chip thicker or to use a more robust ceramic material.

SUMMARY OF THE INVENTION

Embodiments provide an improved sensor device and a method for manufacturing an improved sensor device.

According to one embodiment, a sensor device is disclosed. Preferably, the sensor device is configured to measure a temperature. The sensor device is used, for example, in high power modules such as PIMs.

The sensor device comprises at least one sensor chip. The sensor chip has a plurality of ceramic layers. The ceramic layers preferably have a material with NTC (Negative Temperature Coefficient) characteristics. Preferably, the sensor chip is an NTC multilayer chip.

The sensor chip has a plurality of unprinted ceramic layers. In other words, no further material is applied to the respective ceramic layer. Furthermore, the sensor chip has a plurality of printed ceramic layers. Printed and unprinted ceramic layers are stacked on top of each other. Each unprinted layer can be followed by a printed layer. Preferably, a plurality of unprinted ceramic layers is arranged between two printed layers.

The printed ceramic layers are at least partially printed with an electrically conductive material, for example palladium, platinum, copper, silver or gold. Printing can be carried out in one or more steps. The electrically conductive material is preferably screen-printed onto at least part of the ceramic layer. By means of this process, a precisely predetermined area of the respective layer can be printed precisely.

The sensor device has at least one termination layer for electrical contacting of the electrically conductive material or the inner electrodes. The at least one termination layer may comprise a noble metal, for example Au or Ag.

The electrically conductive material on the printed ceramic layers acts as inner electrodes of the sensor chip. An electrical resistance of the sensor chip is determined either by an overlap area of the electrically conductive material and thus by an overlap of the inner electrodes, or by a distance of the electrically conductive material from the termination layer. The overlap area is the area in which electrically conductive material of different printed ceramic layers is arranged on top of each other in the stacking direction. The larger the overlap area (extent of the area perpendicular to the stacking direction), the lower the resistance. The smaller the overlap area, the greater the resistance. The greater the distance between the electrically conductive material and the termination layer, the greater the resistance.

Due to the chip structure in multilayer design, for a given chip geometry, the resistance is decisively set via the internal structure of the sensor chip. Multilayer technology ensures that the external geometry of different chips always remains the same.

Furthermore, the resistance can be adjusted very well through precise printing, making it easier to achieve high accuracies in terms of process technology. The high reject rate that occurs when the chip is cut out of a substrate is eliminated. External influences due to bonding technology (e.g. bonding) are minimized. This provides a cost-effective and stable sensor device.

In one embodiment, the sensor device has at least one termination layer for electrical contacting of the electrically conductive material or the inner electrodes. The at least one termination layer comprises a noble metal, for example Au or Ag.

The sensor device may have more than one termination layer. For example, the sensor device has two termination layers. These termination layers can be arranged opposite each other on different outer sides of the sensor device. The termination layer is bondable. In other words, it is designed to be connected to a bonding wire.

The termination layer is formed on at least one top side of the sensor device or sensor chip. The top side of the sensor device is thereby that side from which the sensor device is electrically contacted, preferably by means of a bonding wire. In addition, a termination layer can also be formed on a bottom side of the sensor device or the sensor chip. The at least one termination layer is preferably printed or sputtered onto the top side and/or the bottom side of the sensor device.

The termination layer protects the sensor device from external influences. Furthermore, it serves to reliably contact the complete sensor device to the outside. Furthermore, the termination layer ensures electrical contacting of the inner electrodes.

In one embodiment, the sensor device has at least one damping layer. The damping layer is preferably applied directly to at least a partial area of an outer surface of the sensor chip. The term outer surface is understood to mean the top side, the bottom side and the side surfaces of the sensor chip.

Preferably, the damping layer is applied directly to the top side of the sensor chip, for example by means of screen printing. Particularly preferably, the top side of the sensor chip is completely covered with the damping layer.

Alternatively, the sensor device can have an inner termination layer arranged between the damping layer and the sensor chip. In this case, the damping layer can be sandwiched between the inner termination layer and the above-mentioned termination layer. The inner termination layer may serve to contact the electrical material forming the inner electrodes of the sensor chip.

Alternatively or additionally, the damping layer may be applied directly to the bottom side of the sensor chip. Alternatively or additionally, the damping layer may also be applied directly to the side surfaces of the sensor chip. In this context, "directly" is understood to mean that no further material or layer is arranged between the sensor chip and the damping layer. In particular, the damping layer is formed such that it is arranged between the sensor chip and the termination layer.

The damping layer leads to a higher mechanical resistance of the sensor chip compared to standard chips. As a result, the mechanical forces that occur during the bonding process can be absorbed and better distributed, and the sensor chip is less damaged. This provides a robust and cost-effective component.

In one embodiment, the damping layer has a material that has greater elasticity than a material of the termination layer. Thus, the mechanical forces occurring during the bonding process can be reliably compensated. For example, the damping layer comprises a conductive polymer or an epoxy resin filled with silver particles.

According to a further embodiment, a method for manufacturing a sensor device is described. Preferably, the method produces the sensor device described above. Any properties disclosed with respect to the sensor device or the method are also disclosed correspondingly with respect to the respective other embodiment, and vice versa, even if the respective property is not explicitly mentioned in the context of the respective embodiment. The method comprises the following steps:

A) Providing ceramic foils. A plurality of ceramic foils is provided, said foils comprising a material having an NTC characteristic.

B) printing a portion of the ceramic foils with electrically conductive material to form printed ceramic layers and unprinted ceramic layers. The electrically conductive material acts as inner electrodes of the sensor chip in the finished device. The electrically conductive material is preferably screen printed onto a portion of the foils to produce the printed ceramic layers. For example, the electrically conductive material comprises palladium, platinum, copper, gold or silver.

The ceramic foils are printed extremely precisely with the electrically conductive material in a predetermined geometry. The precise printing makes it possible to determine the resistance of the sensor chip. In particular, the overlap area of the electrically conductive material in the stacking direction determines the resistance of the chip and thus of the sensor device.

C) Arranging the printed and unprinted ceramic foils on top of each other to form a stack. In this process, printed and unprinted ceramic foils can be arranged alternately one above the other. Preferably, a plurality of unprinted foils are arranged between two printed foils. Viewed in the stacking direction, the electrically conductive material of the printed foils forms an overlap area.

D) Cutting a desired geometry from the stack to form a sensor chip. A large number of sensor chips with a predetermined geometry can be precisely cut out of the stack.

E) Sintering of the sensor chip. In particular, this step is performed before applying termination and damping layers.

F) Formation of at least one damping layer on at least a portion of an outer surface of the sensor chip. Preferably, the damping layer is printed directly onto the top side (large surface of the sensor chip), for example by means of screen printing. Alternatively or additionally, the damping layer can also be printed directly on the bottom side and/or the side surfaces of the sensor chip. The damping layer may comprise a conductive polymer or an epoxy resin filled with silver particles. The damping layer increases the mechanical stability of the sensor chip and makes it less susceptible to the forces that occur during bonding.

G) Application of a further electrically conductive material to a partial area of the outer surface of the sensor chip and/or to the damping layer to form at least one termination layer. This further electrically conductive material preferably comprises a noble metal, for example silver or gold. The further electrically conductive material is either printed or sputtered on. The material can either be applied directly to a surface of the sensor chip or, in the case of the presence of the damping layer on the surface in question, directly to a surface of the damping layer.

The termination layer forms the outermost layer of the sensor device. The termination layer is adapted to be connected to a bonding wire for electrically contacting the sensor device.

After step E) and before step F), an inner termination layer (15) can be formed on the sensor chip (16), wherein in step F) the damping layer (14) is formed directly on the inner termination layer.

H) Electrically contacting the sensor device. In this step, a bonding wire may be applied to a surface of the termination layer. Alternatively, the sensor device can be contacted by a sintered joint or a solder joint.

The sensor device produced by the process is characterized by particular robustness. The damping layer allows the mechanical forces occurring during bonding to be absorbed and optimally distributed. Furthermore, in this device, the resistance can be precisely adjusted by the internal structure of the sensor chip.

BRIEF DESCRIPTION OF THE DRAWINGS

The drawings described below are not intended to be to scale. Rather, individual dimensions may be enlarged, reduced or even distorted for better representation.

Elements that are similar to each other or that perform the same function are designated with the same reference signs.

FIG. 1 shows a sensor device according to the state of the art;

FIG. 2 shows a partial aspect of a sensor device according to an embodiment;

FIG. 3a shows a partial aspect of a sensor device according to a further embodiment;

FIG. 3b illustrates a partial aspect of a sensor device according to a further embodiment;

FIG. 3c illustrates a partial aspect of a sensor device according to a further embodiment;

FIG. 4 shows a sensor device according to one embodiment; and

FIG. 5 shows a sensor device according to a further embodiment.

DETAILED DESCRIPTION OF ILLUSTRATIVE EMBODIMENTS

FIG. 1 shows a sensor device 1 according to the state of the art. The sensor device 1 has a chip 2, in particular a ceramic chip 2. For example, the chip 2 is an NTC chip and the sensor device 1 is used for temperature measurement. This sensor device 1 finds application, for example, in high power modules such as PIMs.

With the help of termination layers 3 made of noble metals (for example Ag or Au), the chip 2 is applied onto a substrate 5 by means of a sintering process (for example sintered silver 4).

The chip 2 is then contacted on the surface by means of a bonding wire 6, whereby the termination layer 3 must be adapted to the bonding material and the bonding technology (wire thickness, etc.). The termination layers 3 are usually applied by sputtering or screen printing.

The chip 2 is usually cut out of a sintered and polated substrate. The resistance of the chip 2 or the sensor device 1 is controlled by the geometry of the chip 2. Especially for narrow resistance tolerances, this process is relatively complex, since the geometry has a very large influence. As a result, this process is subject to rejects and is time-consuming.

Also, the geometry of the individual chips 2 is not uniform since the chips 2 from each ceramic substrate can have slightly different geometries. Furthermore, damage to the chip 2 may occur when it is cut out.

Furthermore, depending on the bonding technology and the process parameters selected for the sensor device 1, very high forces can act on the chip 2, which can result in damage or even complete breakage of the chip 2.

In the sensor device or the partial aspects of the sensor device described below, a chip is constructed with a multi-layer process and inner electrodes in order to be able to adjust the resistance significantly via the internal structure of the chip. This minimizes external influences due to the interconnection technology.

Furthermore, a surface termination of the sensor chip is proposed below, which enables the sensor chip and thus the entire sensor device to withstand higher forces during the bonding process without damage.

FIG. 2 shows a partial aspect of a sensor device 10 according to one embodiment. In particular, FIG. 2 shows a sensor chip 16 of the sensor device 10. The sensor chip 16 has a plurality of ceramic layers 11, 12.

The sensor chip 16 is a multilayer chip. In particular, the sensor chip 16 is a multilayer NTC chip. In other words, the ceramic layers 11, 12 have a material with NTC characteristics. The sensor chip 16 or the sensor device 10 is thus designed to measure a temperature. The sensor device 10 is designed to be used in high power modules such as PIMs.

The sensor chip 16 has a plurality of unprinted ceramic layers 11. The sensor chip 16 further comprises a plurality of printed ceramic layers 12. The respective printed ceramic layer 12 is printed with an electrically conductive material 13, for example Ag or Au or Cu.

The respective printed ceramic layer 12 is only partially printed with the electrically conductive material 13. The electrically conductive material 13 extends in each case to an edge region of the respective printed ceramic layer 12. The electrically conductive material 13 forms the inner electrodes 19 of the sensor chip 16 (see also FIGS. 3a to 3c).

Printed and unprinted layers 11, 12 can, for example, be arranged alternately. Preferably, a printed ceramic layer 12 is followed by a plurality of unprinted ceramic layers 11.

The ceramic layers 12 are printed with the electrically conductive material 13 and subsequently stacked in such a way that the inner electrodes 19 or the electrically conductive material 13 of the printed ceramic layers 12 at least partially overlap. In other words, the material 13 forms an overlap area 17 in the stacking direction. The resistance of the sensor chip 16 is determined by the overlap area 17, in particular by a size of the overlap area 17 (extension of the overlap area 17 perpendicular to the stacking direction). The larger the overlap area 17, i.e. the larger the extension of the overlap area 17 perpendicular to the stacking direction, the lower the resistance. The smaller the overlap area 17, the greater the resistance.

The sensor chip 16 has an outer surface 16a. The outer surface 16a is formed by two opposite large-area sides, which in the sensor device 10 form the top side 20 and the bottom side 21 of the sensor chip 16, respectively. The outer surface 16a is further formed by the side surfaces 22 of the sensor chip 16.

For electrical contacting of the inner electrodes 19, termination layers 15 are provided (not explicitly shown, see FIG. 4). The respective termination layer 15 has a noble metal, for example Au or Ag.

In particular, one termination layer 15 is preferably formed on the top side 20 and one termination layer 15 on the bottom side 21. Alternatively, for example, a termination layer 15 can also be formed only on the top side 20. In contrast to the known multilayer chips, the inner electrodes 19 (electrically conductive material 13) are thus contacted via the "large surfaces" (top side 20 and/or bottom side 21 of sensor chip 16).

In this case, the termination layer 15 does not have to be in direct contact with an outer surface 16a of the sensor chip 16. Preferably, a further layer is formed between the sensor chip 16 and the termination layer 15, in particular a damping layer 15, which is described in detail in connection with FIG. 4.

By constructing the sensor chip 16 in multilayer technology, it can be ensured that the outer geometry of different sensor chips 16 is always the same, since there is no need to cut them out of a ceramic substrate. Furthermore, by precise printing of the ceramic layers 12 the resistance can be adjusted very well. Thus, high accuracies can be achieved more easily in terms of process technology.

All known design variants for multilayer technology can be transferred to this design for sensor chips 16, as can be seen in FIGS. 3a to 3c.

FIG. 3a shows a sensor chip 16 with inner electrodes 19 in the so-called gap design. A first termination layer 15a is arranged on a top side 20 of the sensor chip 16. A second termination layer 15b is arranged on a bottom side 21 of the sensor chip 16.

Here, a predetermined partial area of the respective printed ceramic layer 12 (here, for example, the partial area adjacent to the bottom side 21 of the sensor chip 16) is completely free of inner electrodes. The second termination layer 15b adjoins this partial area of the ceramic layer 12. Inner electrodes 19 are formed on a further predetermined partial region (in this embodiment example, the partial region adjacent to the top side 20) of the printed layer 12.

The inner electrodes 19 are electrically contacted via the first termination layer 15a. All inner electrodes 19 have the same polarity. An active volume of the sensor chip is formed between the ends of the inner electrodes 19 facing the bottom side 21 and the second termination layer 15b. An extension of the inner electrodes 19/the electrically conductive material 13 perpendicular to the stacking direction thereby determines the size of the active volume. An overlap area 17 of inner electrodes 19 of different polarity is not provided in this embodiment.

FIG. 3b shows a sensor chip 16 with inner electrodes 19 (electrically conductive material 13) in an overlap design, as already shown in connection with FIG. 2. Here, different sections of ceramic layers 12 are printed with electrically conductive material 13 and arranged in a stack. Thus, first ceramic layers 12 have a printed partial area which extends from a central area of the respective ceramic layer 12 to the top side 20 of the sensor chip 16. Second ceramic layers 12 have a printed partial area which extends from a central area of the respective ceramic layer 12 to the bottom side 21 of the sensor chip 16. The printed areas or the inner electrodes 19 overlap in the stacking direction (overlap area 17).

In this embodiment, the sensor device 10 preferably has at least two termination layers 15. These termination layers 15 are formed on the top side and on the bottom side of the sensor device 10 and the sensor chip 16, respectively.

FIG. 3c shows a sensor chip 16 with serial wiring of the inner electrodes 19. Here, first ceramic layers 12 have two printed partial areas. One of these partial areas extends from a central area of the respective ceramic layer 12 to the top side 20 of the sensor chip 16. The other partial area extends from the central area of the respective ceramic layer 12 to the bottom side 21 of the sensor chip 16. The partial area extending from the central area to the top side 20 forms first inner electrodes 19a. The section extending from the middle area to the underside forms second inner electrodes 19b. One first and one second inner electrode 19a, 19b are arranged in one plane and do not touch each other.

Second ceramic layers have only one printed partial area (here the central area). Floating electrodes 19c, which are not electrically connected to a termination layer, are formed on the second ceramic layers by printing only in the central region.

The sensor chip 16 has two termination layers 15a, 15b. The first termination layer 15a is arranged on the top side 20 and connected to the first inner electrodes 19a, which extend to the top side 20. The second termination layer 15b is arranged on the bottom side 21 and connected to the second inner electrodes 19b, which extend to the bottom side 21.

This results in two overlap areas 17 of the inner electrodes 19. In particular, there is a first overlap area 17a formed in a region of the sensor chip 16 that is closer to the top side 20. The first overlap area is formed by the overlap of the first inner electrodes 19a and the floating electrodes 19c. A second overlap area 17b is located closer to the bottom side 21 of the sensor chip. The second overlap area is formed by the overlap of the second inner electrodes 19b and the floating electrodes 19c. The overlap areas 17a, 17b add up to a total overlap area 17.

FIG. 4 describes a sensor device 10 according to an embodiment.

The sensor device 10 has a sensor chip 16 described in connection with FIGS. 2 and 3a to 3c. The sensor chip 16 is an NTC chip in multilayer technology. As described above, the resistance of the sensor chip 16 is described by the size of the overlap area 17 of the inner electrodes 19.

The sensor chip 16 has the outer surface 16a, which is formed by the top side 20, the bottom side 21 and the side surfaces 22 (see also FIG. 2).

The sensor chip 16 further comprises a damping layer 14. The damping layer 14 is in direct mechanical contact with the sensor chip 16. The damping layer 14 is preferably applied to the sensor chip 16 by screen printing.

The damping layer 14 is designed and arranged to ensure a higher mechanical resistance of the sensor chip 16 compared to standard chips. This allows the mechanical forces that occur during the bonding process to be absorbed and better distributed. As a result, there is less damage to the sensor chip 16 compared to standard chips.

The damping layer 14 preferably comprises an electrically conductive polymer. For example, the damping layer 14 may comprise poly-3,4-ethylenedioxythiophene (PEDOT or PEDT). The damping layer 14 may further comprise polystyrenesulfonate (PSS). Alternatively, the damping layer 14 may comprise polyparaphenylene (PPP) as a conductive polymer, for example.

In an alternative embodiment, the damping layer 14 may also comprise an epoxy resin filled with Ag particles.

In this embodiment example, the damping layer 14 is formed directly on the top side 20 of the sensor chip 16. Alternatively or additionally, the damping layer 14 may also be formed directly on the bottom side 21 of the sensor chip 16.

The sensor device 10 further comprises at least one termination layer 15. Preferably, the sensor device 10 has two termination layers 15. These are preferably formed on opposite outer surfaces of the sensor device 10 (not explicitly shown).

The damping layer 14 is arranged between the sensor chip 16 and the termination layer 15. In other words, the termination layer 15 is applied to the damping layer 14, for example by sputtering or screen printing. The termination layer 15 has an electrically conductive material, preferably a noble metal. The termination layer 15 has Au or Ag, for example. The termination layer 15 serves to make electrical contact with the inner electrodes 19.

Preferably, the damping layer 14 has a greater thickness (in this case extension perpendicular to the stacking direction) than the termination layer 15. Furthermore, the material of the damping layer 14 has a greater elasticity than the material of the termination layer 15. In this way, the sensor chip 16 can compensate for greater mechanical loads during the bonding process than is the case with standard chips.

For electrical contacting, the sensor device further comprises a bonding wire 18. The bonding wire 18 is directly connected to a surface of the termination layer 15.

FIG. 5 shows a further embodiment of the sensor device 10 in schematic view. The sensor device 10 has two damping layers 14, between which the sensor chip 16 is arranged. Thereby, the sensor chip 16 may be formed according to one of the embodiments described in connection with FIGS. 3a to 3c.

Each of the damping layers 14 is sandwiched by an inner termination layer 15c, which faces and is immediately adjacent to the sensor chip 16, and an outer termination layer 15, which forms the top side or bottom side of the sensor device 10. The inner termination layer 15c serves for the electrical contacting of the inner electrodes 19. The outer termination layer 15 serves for the electrical contacting of the sensor device 10, for example by means of a bonding wire, by means of a sintered layer or by means of a solder layer. The damping layers 14 increase the mechanical stability of the sensor device 10.

In the following, a method for manufacturing a sensor device 10 is described. Preferably, the method manufactures the sensor device 10 according to one of the embodiments described above. All features described in connection with the sensor device 10 are therefore also applicable to the method and vice versa.

In a first step A) a plurality of ceramic foils is provided. The ceramic foils have a material with NTC characteristics. The ceramic foils serve as a basis for the production of the printed ceramic layers 12 and the unprinted ceramic layers 11.

In a further step B), part of the ceramic foils is printed with electrically conductive material 13 to form the printed ceramic layers 12. The areas of the printed ceramic layers 12 printed with the electrically conductive material 13 form the inner electrodes 19 of the sensor chip 16 in the finished sensor device 10. The overlap area 17 between the inner electrodes 19 determines the resistance of the finished sensor chip 16.

In a further step C), the printed and unprinted ceramic foils are arranged one above the other to form a stack. One printed ceramic foil is followed by at least one, preferably a plurality, of unprinted ceramic foils (see also FIG. 2).

In a further step D), a desired or predetermined geometry is cut out of the stack to form the sensor chip 16. A large number of sensor chips 16 with the same predetermined geometry can be cut out. Deviations in the geometry due to cutting out the chips from a carrier material are eliminated.

In a further step E), the cut-out stack/sensor chip 16 is sintered.

Subsequently, in step F), at least one damping layer is applied to at least part of the outer surface 16a of the sensor chip 16, preferably by screen printing. For example, the damping layer 14 is printed directly onto the top side 20 of the sensor chip 16. Preferably, the damping layer 14 comprises a conductive polymer or an epoxy resin filled with silver particles.

In a next step G), another electrically conductive material, preferably a noble metal, is provided to form at least one termination layer 15. The termination layer 15 serves for electrical contacting of the inner electrodes 19.

The material of the termination layer 15 is applied, for example, to the damping layer 14 and/or to a partial area of the outer surface 16a (preferably to the large-surface sides forming the top side 20 and the bottom side 21 of the sensor chip 16), for example by means of sputtering or by means of screen printing.

Preferably, the termination layer 15 is applied directly on the damping layer 14, thus forming an upper termination of the sensor device 10. In addition, a termination layer 15 is preferably formed directly on the bottom side 21 of the sensor chip 16 (if no further damping layer 14 is formed there, in which case the further termination layer 15 is arranged on the damping layer 14).

In a final step H), the sensor device 10 is electrically contacted. This is done by applying a bonding wire 18 to a surface of the termination layer 15. Due to the damping layer 14 formed between the termination layer 15 and the sensor chip 16, the mechanical loads occurring in the process can be largely compensated and damage to the sensor chip 16 can thus be avoided.

The description of the objects disclosed herein is not limited to the individual specific embodiments. Rather, the features of the individual embodiments can be combined with one another in any desired manner, insofar as this makes technical sense.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A sensor device comprising:
   a sensor chip comprising a plurality of printed ceramic layers and unprinted ceramic layers;
   at least one termination layer configured to make electrical contact with an electrically conductive material,
   wherein the termination layer is formed at least on a top side and/or on a bottom side of the sensor chip,
   wherein the printed ceramic layers are at least partially printed with an electrically conductive material, and
   wherein an electrical resistance of the sensor chip is determined by an overlap area of the electrically conductive material or by a distance of the electrically conductive material from the termination layer; and
   at least one damping layer directly located at at least a partial area of an outer surface of the sensor chip,
   wherein the at least one damping layer comprises a material which has a greater elasticity than a material of the termination layer, and
   wherein the at least one damping layer comprises a conductive polymer.

2. The sensor device according to claim 1, wherein the at least one termination layer comprises a noble metal.

3. The sensor device according to claim 1, wherein the at least one termination layer is printed or sputtered on.

4. The sensor device according to claim 1, wherein the at least one damping layer is located between the sensor chip and the termination layer.

5. The sensor device according to claim 1, further comprising an inner termination layer arranged between the at least one damping layer and the sensor chip.

6. The sensor device according to claim 1, wherein the at least one damping layer further comprises an epoxy resin filled with silver particles.

7. The sensor device according to claim 1, wherein the at least one damping layer is applied to at least a partial area of the outer surface of the sensor chip by screen printing.

8. The sensor device according to claim 1, wherein the sensor device is configured to measure a temperature.

9. The sensor device according to claim 1, wherein the sensor chip is an NTC multilayer chip.

10. A method for manufacturing a sensor device, the method comprising:
    providing ceramic foils;
    printing a part of the ceramic foils with electrically conductive material to form printed ceramic layers and unprinted ceramic layers;
    superimposing the printed and unprinted ceramic foils to form a stack;
    cutting out a desired geometry from the stack to form a sensor chip;
    sintering the sensor chip;
    forming at least one damping layer on at least a portion of an outer surface of the sensor chip; and
    applying a further electrically conductive material on a partial area of the outer surface of the sensor chip and/or on the at least one damping layer to form at least one termination layer,
    wherein the at least one damping layer comprises a conductive polymer.

11. The method according to claim 10, wherein the at least one damping layer further comprises an epoxy resin filled with silver particles.

12. The method according to claim 10, wherein the at least one damping layer is applied to at least a partial area of the outer surface of the sensor chip by screen printing.

13. The method according to claim 10, wherein the ceramic foils comprise a material with NTC characteristics.

14. The method according to claim 10, further comprising, after sintering the sensor chip, forming an inner termination layer on the sensor chip, wherein the at least one damping layer is formed directly on the inner termination layer.

15. The method according to claim 10, further comprising electrically contacting the sensor device, wherein the sensor device is electrically contacted by applying a bonding wire to a surface of the termination layer or by a sintered joint or by a solder joint.

16. The method according to claim 10, wherein the at least one damping layer comprises a material having a greater elasticity than a material of the termination layer.

17. The method according to claim 10, wherein the at least one damping layer comprises poly-3,4-ethylenedioxythiophene (PEDOT or PEDT), polystyrenesulfonate (PSS) or polyparaphenylene (PPP) as the conductive polymer.

18. The sensor device according to claim 1, wherein the at least one damping layer comprises poly-3,4-ethylenedioxythiophene (PEDOT or PEDT), polystyrenesulfonate (PSS) or polyparaphenylene (PPP) as the conductive polymer.

* * * * *